US009467809B2

(12) United States Patent
Lopez (10) Patent No.: US 9,467,809 B2
(45) Date of Patent: Oct. 11, 2016

(54) APPARATUS, METHOD, AND SYSTEM FOR PROVIDING SPOT LOCATION IDENTIFICATION (71) Applicant: Verizon Patent and Licensing Inc., Arlington, VA (US)

(72) Inventor: Antonia J. Lopez, San Bruno, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 122 days.

(21) Appl. No.: 14/319,938

(22) Filed: Jun. 30, 2014

(65) Prior Publication Data
US 2015/0382144 A1 Dec. 31, 2015

(51) Int. Cl.
*H04W 24/00* (2009.01)
*H04W 4/02* (2009.01)
*G06Q 10/02* (2012.01)
*G01C 21/20* (2006.01)

(52) U.S. Cl.
CPC ............ *H04W 4/023* (2013.01); *G01C 21/206* (2013.01); *G06Q 10/02* (2013.01)

(58) Field of Classification Search
CPC ...... H04W 4/023; G01C 21/00; G06Q 10/02
USPC ....................................... 455/456.2
See application file for complete search history.

(56) References Cited

U.S. PATENT DOCUMENTS

| 2013/0179201 A1* | 7/2013 | Fuerstenberg ..... G06Q 30/0255 705/5 |
| 2013/0293351 A1* | 11/2013 | Kuenzi .................. G06F 21/35 340/5.73 |
| 2015/0227969 A1* | 8/2015 | Hanly ................ G06Q 30/0252 705/14.5 |

* cited by examiner

*Primary Examiner* — Amancio Gonzalez (57) ABSTRACT

An approach is provided for identifying the location of a seat in a dark venue. A location identification platform determines the location of a user's seat. The location identification platform then displays the route to a seat for the user which is used to help the user find their seat.

20 Claims, 10 Drawing Sheets

APPARATUS, METHOD, AND SYSTEM FOR PROVIDING SPOT LOCATION IDENTIFICATION

BACKGROUND

Service providers and device manufacturers (e.g., wireless, cellular, etc.) are continually challenged to deliver value and convenience to consumers by, for example, providing compelling network services. One area of interest has been the development of services that enable users to take advantage of the communication abilities of modern communication devices (e.g., smartphones, tablets, personal computers, etc.), such as near field communication (NFC) technology. Seating in concert halls, stadiums, and movie theaters are only one possible use of such technology. Oftentimes, events have already started and attendees need to find or return to their seat in the dark, this can be annoying for other attendees and difficult for the person looking for their seat as the searcher may lose track of where they were sitting. One way to prevent such disturbances is to have attendees use their mobile device to aid in finding their seat. However, mobile devices do not always have access to global positioning satellite (GPS) information at the level of detail necessary for finding a seat within large sections of seats and/or GPS access inside the venue. Accordingly, service providers and device manufactures face significant technical challenges to create services that enable seat location identification in such settings.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF EXEMPLARY EMBODIMENTS

A method, apparatus, and system capable of identifying a precise location in an event venue, is described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. Other embodiments may include practices for non-seat locations, such as parking spots and other reserved locations, where a user may find their vehicle by identifying a path to the parking spot and/or usage for non-obstructed views of seats such as well-lit venues.

Although various exemplary embodiments are described with respect to a mobile device, it is contemplated that these embodiments have applicability to any device capable of communicating over a network.

Figure 1:
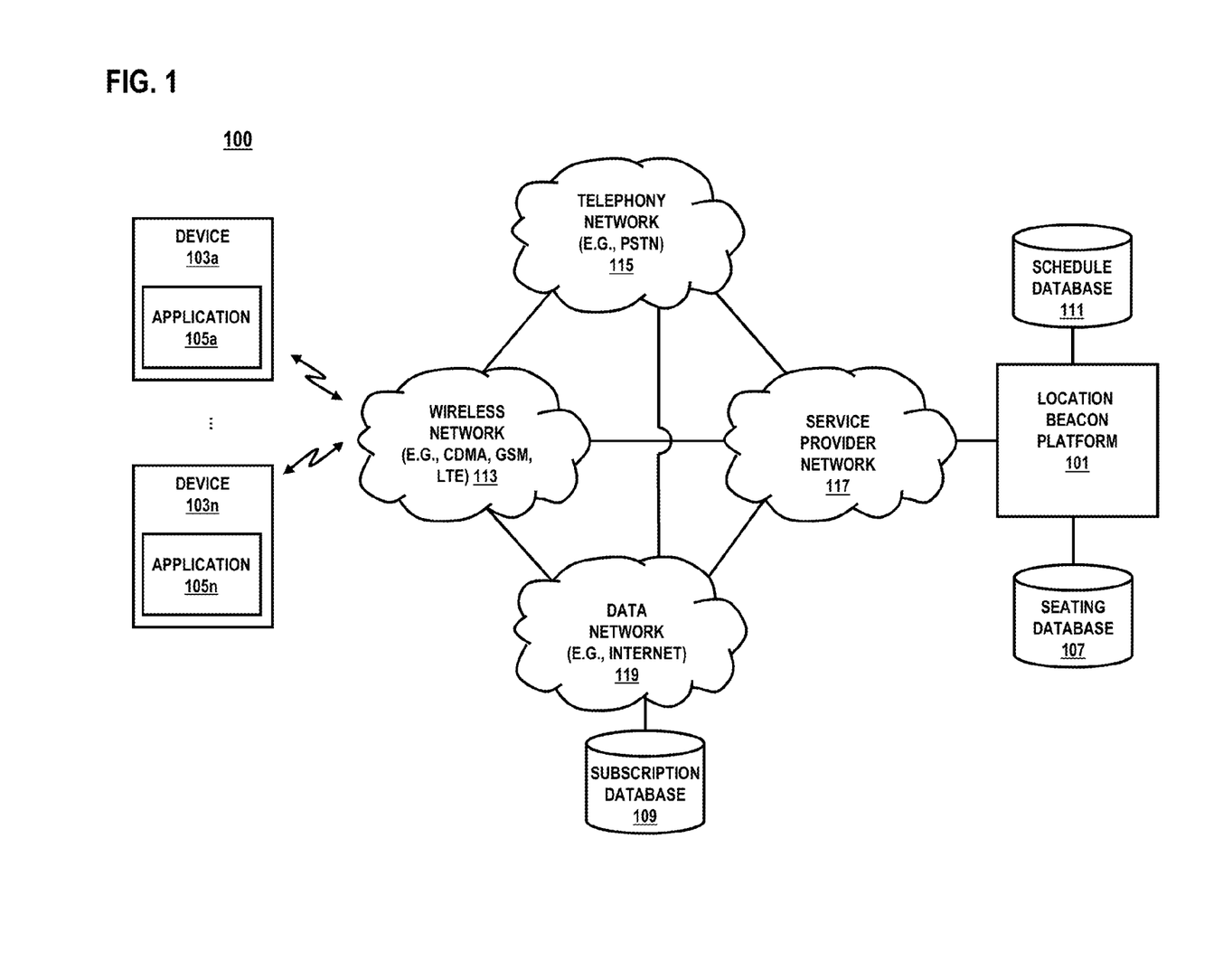
FIG. 1 is a diagram of a system capable of identifying a precise location in a venue, according to one embodiment.

FIG. 1 is a diagram of a system capable of identifying a precise location in a venue, according to one embodiment. As previously discussed, one area of interest has been the development of services that enable user to take advantage of the communication abilities of modern communication devices. More specifically, NFC, Bluetooth®, or other short distance communication protocols. These communication methods are best used to find or return to a user's seat because of their location sensitive applications. As users may have difficulty finding their seats in a crowd or in darkened venues, they may disrupt other attendees and even performers while looking for their seats. Although various exemplary embodiments are described with respect to NFC, it is contemplated that these embodiments have applicability to any short distance communication protocols.

To address this problem, a system 100 of FIG. 1 introduces the capability to use user devices and beacons located on-site to aid in identification of a precise location. As shown in FIG. 1, the system 100 comprises a device 103*a*-103*n* (e.g., a smartphone or a tablet) having connectivity to a location beacon platform 101 via a wireless network 113, telephony network 115, service provider network 117, and data network 119. FIG. 1 also includes application 105*a*-105*n* (herein, application 105) for allowing the user to manage the location identifying capabilities of the location beacon platform 101, a subscription database 109 for storing subscription data (e.g., user preferences and profile information) from users of device 103*a*-103*n* (herein, device 103), a schedule database 111 for storing events schedule (e.g., a concert scheduled for the New Year's eve, theater showing times, etc.), and a seating database 107 for storing data related to the tickets (e.g., ticket number, seat number, number of tickets, seat located) of a user of device 103. In one scenario, system 100 allows one or more users to connect their devices 103 to the smart-chairs in the vicinity. Once the connection is created using NFC, a user may tap his/her device 103 to notify the smart-chairs of his presence in the vicinity. Then, system 100 may implement several navigation tactics to guide users to their assigned seats.

By way of example, the device 103 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the device 103 can support any type of interface to the user (such as "wearable" circuitry, etc.). In addition, the device 103 may include type of sensor, for example, a global positioning sensor for gathering location data, a position sensor or gyroscope for detecting device orientation and/or tilt, a network detection sensor for detecting wireless signals or network data or temporal information, a camera/imaging sensor for gathering image data, an audio recorder for gathering audio data, a compass, a magnetometer, an accelerometer and the like.

By way of example, the application 105 may be any type of application that may perform various processes and/or functions at the device 103. In one embodiment, the applications 105 may include mapping and/or navigation applications, location-based applications (e.g., enabling "check-ins"), voice-recognition applications, messaging applications (e.g., short message service (SMS), multimedia service (MMS), etc.), an Internet browser, media applications, social networking applications, etc. In one embodiment, application 105 at the device 103 may act as a client for the location beacon platform 101 and perform one or more functions associated with the functions of the location beacon platform 101.

In one embodiment, the location beacon platform 101 may receive location information associated with a device to identify the location of a seat in a venue. The location information for a device may be based on a communication site for the device, an assigned location of the device, or combination thereof. The location beacon platform 101 may determine that a device is not within vicinity, and may receive a request for determining location for a seat in the vicinity. Then, the location beacon platform 101 may activate a signal to indicate the location for a seat. In one example embodiment, when a user arrives at a venue, the location beacon platform 101 may provide information on how a user can interact with the venue. For example, a user may bump or use NFC in their device 103 to identify their current location and to find the way to their seat. In one scenario, the location beacon platform 101 may display various symbols, lights, colors, or a combination thereof in the device 103 as the user navigates to the seat. In another scenario, when a user reaches his/her seat, the user may bump his device 103 with the seat, whereupon the device 103 may send NFC ID of the seat to the location beacon platform 101 to confirm his/her arrival.

In one embodiment, the location beacon platform 101 may detect changes in the seat position for the at least one user, wherein a user may be navigated to a newly assigned seat via display of various symbols, lights, colors etc. In one scenario, upon detecting arrival of a user, the location beacon platform 101 may unlock a premium seat that is locked waiting for arrival of the user. In one scenario, the location beacon platform 101 may provide navigational aids to the user if the user decides to leave the seat for some reason, for example, go to the lavatory. The navigational aids may be provided either through the device 103 (pictorial display, map display, audio navigation etc.) or though the venue (lighted arrows on the floor). In another scenario, when a user wishes to return to his/her seat, he/she may trigger the seat beacon by his/her device 103 to cause the seat to flash and possibly trigger some navigational aids in the venue. The seat beacon is directional and pointed up the aisles so as not to disturb other patrons, and may flash for a predetermined amount of time.

In one embodiment, the location beacon platform 101 may include or be associated with at least one schedule database 111, a seating database 107, or a combination thereof. It is also contemplated that the location beacon platform 101 have access to the subscription database 109 through wireless network 113, telephony network 115, service provider network 117, and/or data network 119. Additionally, in another embodiment, the seating database 107, the schedule database 111, the subscription database 109, or any combination thereof may be included within the location beacon platform 101. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the service provider network 117 may be able to provide other services related to an event stored in the schedule database 111 such as mapping and/or navigation services for assisting the user to find the venue location, phone and electronic communication services (e.g., email, SMS, etc.) for updating the user about the event e.g., any delay or reminding the user about an event, the location-based services (e.g., traffic updates) assisting the user to arrive on time to the venue, and media related services for event promotion (e.g., trailer), social networking services for e.g., sharing a seat location with a friend so the friend can make sure that he/she purchases a seat next to the user's seat, etc.

In one embodiment, the system 100 receives a location associated with a device, wherein the location is based on a communication site for the device, an assigned location of the device, or combination thereof; determines that the device is not in a vicinity of the location; receives a request for the location from the device; activates a location beacon to indicate the location, wherein the location beacon is a physical beacon, a virtual beacon, or a combination thereof; presents navigation aid for directing a user of the device to the location beacon.

By way of example, a person may buy a ticket for a concert through her/his mobile phone, prior or post installation of a venue application 105. Once the application is installed, the user may enter the venue where an event, such as a concert or movie, will or is occurring and find his/her seat using the location beacon system without having to guess at the location of his/her seat trying to find his/her seat in a dark theater while disturbing other attendees. The user may locate his/her seat by receiving directions (e.g., right side first aisle, walk 5 rows up the stairs, walk 5 feet to the right, etc.), by seeing his/her location as compared to the seat location (e.g., map of a theater with points representing the user location and a square representing the seat location), by activating a beacon located at the seat (e.g., a light, symbol), or any other signal that will call to the user's attention the location of his/her seat. It is contemplated that a beacon that may vary in intensity, propagation direction, frequency or wavelength spectrum, polarization, etc.

In another example, the user leaves a shopping mall and goes to the parking lot to find his/her car when the user realizes that he/she does not remember where the car is parked. Instead of wandering around the parking lot, the user is able to find his/her car using his/her mobile device. In this example, it is contemplated that the user may be able to find his/her car based on information inserted by the user at the time he/she parked the car, on parking lot ticket information (e.g. the ticket designates the specific parking spot when entering the parking lot), on the device movement history, on search history for parking spots (in this case, the user would also be able to find spots available in the parking lot prior to entering the parking lot), or any other information.

The subscription database 109 may store information such as a user's preferences and profile information. The user's preference may include the location of the seat, preference for VIP seats, location beacon type, seat identification method, or any other preference. User profile may include e.g., whether the user has any special need (e.g., seats for people with disabilities), extra leg room, or any other profile information. The schedule database 111 stores events schedule. This may also include maps of multiple theaters, event schedule of a venue, among others, while the seating database 107 stores data related to the tickets of a user of device 103 such as ticket number, seat number, number of tickets, where the seat is located, and may also include where the seat is located in relation to other patrons that share this information with the location beacon platform 101.

By way of example, the device 103, the location beacon platform 101, the wireless network 113, the telephony network 115, the service provider network 117, the data network 119 may communicate with each other and each other's components using well known, new or still developing protocols.

Figure 2:
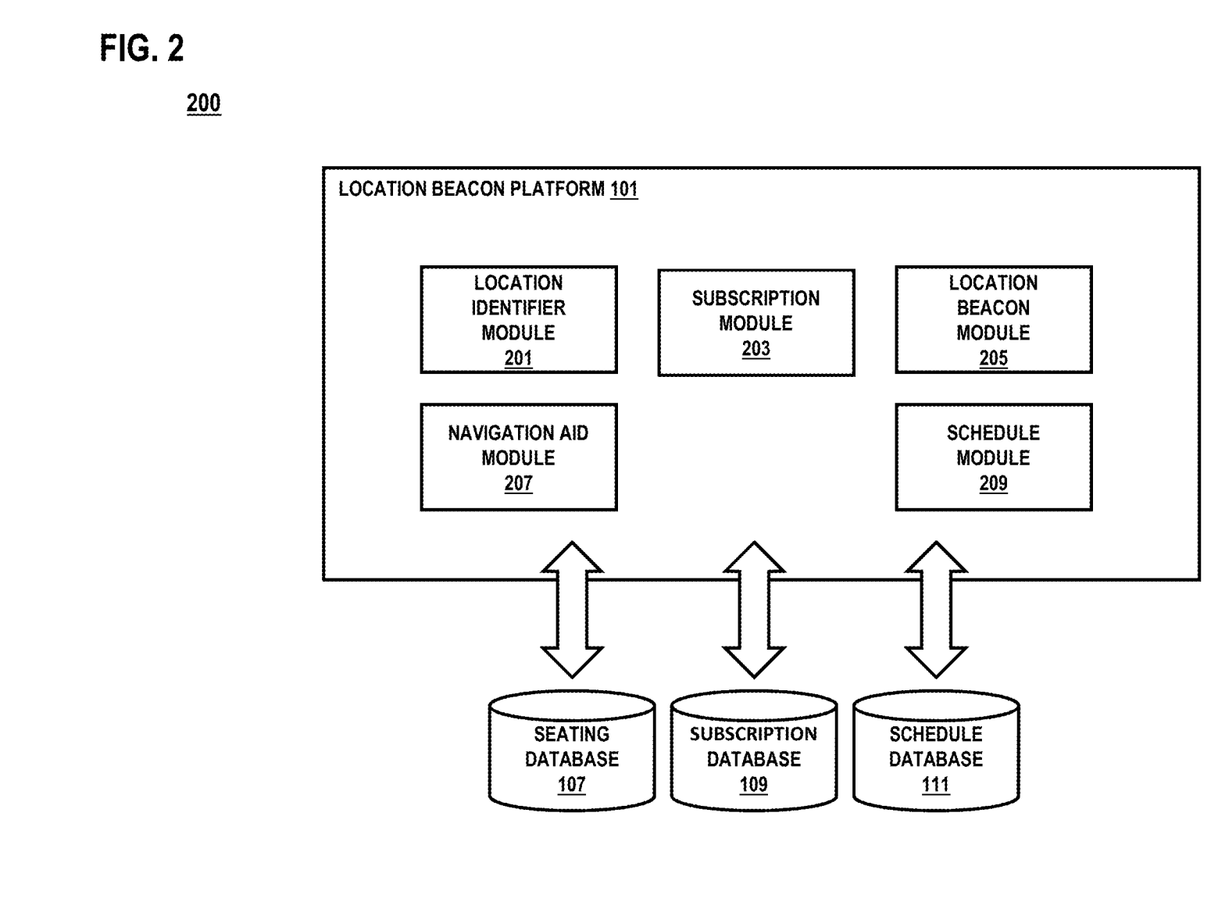
FIG. 2 is a diagram of the components of a location beacon platform, according to one embodiment.

FIG. 2 is a diagram of the components of a location beacon platform, according to one embodiment. In one embodiment, the location beacon platform 101 includes a location identifier module 201, the subscription module 203, the location beacon module 205, the navigation aid module 207, the schedule module 209, and communicates with the seating database 107, the subscription database 109, and/or the schedule database 111. It is contemplated that the seating database 107, the subscription database 109, the schedule database 111, or any combination of these databases may be included within, or associated with, the location beacon platform 101. It is contemplated that the functions of these components may be combined in one or more components or performed by other components of equivalent functionality.

In one embodiment, the subscription module 203 authenticates user login information by matching the log information with the subscription database. Once the log information is authenticated, the schedule module 209 will retrieve information about the event from the schedule database 111 such as theater, time, and seat locations. The information retrieved from schedule database 111 will be matched with the information from the seating database 107 by the location identifier module 201. The location beacon module 205 activates beacon(s) which can be perceived by the user, while the navigation aid module 207 assists the user in navigating in the theater and guide the user to his/her seat either virtually through diagrams of the theater or physically with beacon(s). The beacon(s) may be used to describe a path (e.g., routing information) to the user's seat step-by-step as well as through simply indicating the seat. In some embodiments, the beacon(s) along the path (e.g., intermediate path beacons) may be activated one at a time as the user reaches each beacon or all at once to show the entire path fully. The intermediate path beacons may be activated by a user touching their device 103 to NFC devices located at each beacon. The navigation aid module 207 may determine both the navigation path virtually as well as determine which intermediate path beacons need to be activated to create a path to the user's seat. In other embodiments, the location beacon module 205 may be used to modulate the beacon between active and inactive states for the user to identify the location should multiple beacons be used within the same area at the same time by stopping the beacon while others continue. This activation and deactivation may occur by sending and receiving a signal from a user device. The user may also modulate their beacon by changing the beacon settings with the location beacon module 205 based on the various color, intensity, or pattern choices.

The location identifier module 201 is responsible for identifying the device's current location, for matching the device's current location with the location of the user's seat, and for recognizing when the device is not in his/her designated seat. The location identifier module 201 also communicates with the subscription module 203, the location beacon module 205, the navigation aid module 207, the schedule module 209, when the location identifier module 201 recognizes that the device is not in his/her designated seat, or when the user access the application 105. The location identifier module 201 will constantly communicate with the device 103 so the location beacon platform 101 can convey real-time location of the user in comparison to his/her designated seat location. In one embodiment, the location identifier module 201 receives information from device 103 based on NFC device signals to the location beacon platform 101. The NFC device may be located at the entrance(s) to a theater as well as at the user's seat, which may let the location identifier module 201 whether the user is leaving their seat or looking for their seat. The location identifier module 201 also retrieves information from the seating database 107 to determine the venue size, seat locations, walkway locations, etc. for the specified venue. In one embodiment, the device may also determine that the user device is within a vicinity of the seat based on communication between the user device and a wireless beacon at the seat.

The subscription module 203, in addition to authenticating user login information by matching the log information with the subscription database, provides the information to the schedule module 209 so the schedule module 209 can retrieve the correct information from schedule database 111. The subscription module 203 is also responsible for communicating with the device 103 by receiving login information of the user/subscriber. The location beacon module 205 and navigation aid module 207, may communicate with the device 103 for conveying the necessary information to the user/subscriber.

It is contemplated that the location beacon platform 101 conveys location information of another user/subscriber that shared his or her ticket information so the user/subscriber may use the location beacon platform 101 to locate another user/subscriber's location. This can allow a user/subscriber to find the location of a friend that was not able to buy tickets for a seat in the vicinities of the seat of the user/subscriber. Such shared information may be stored in the subscription database 109 or the seating database 107.

The schedule module 209 determines venue events, start times, duration, etc. and may be used to clear the seating database 107 of user seating information between events. By way of example, a movie theater has 10 theaters for watching different movies running for varying lengths of time. The schedule module 209 retrieves information from the schedule database 111 regarding theater number 6 and its movie showings and times so that after each movie showing the location beacon platform 101 clears the seating database 107 for theater number 6, of user information or replaces user information for each seat based on previously purchased tickets, for the next showing. The schedule then determines which device(s) may be associated to the seats/location at what time. The schedule module 209 may also communicate with device 103 in order to update the user of any change in the schedule database 111 e.g. the time, location, or any other information regarding the event.

Figure 3:
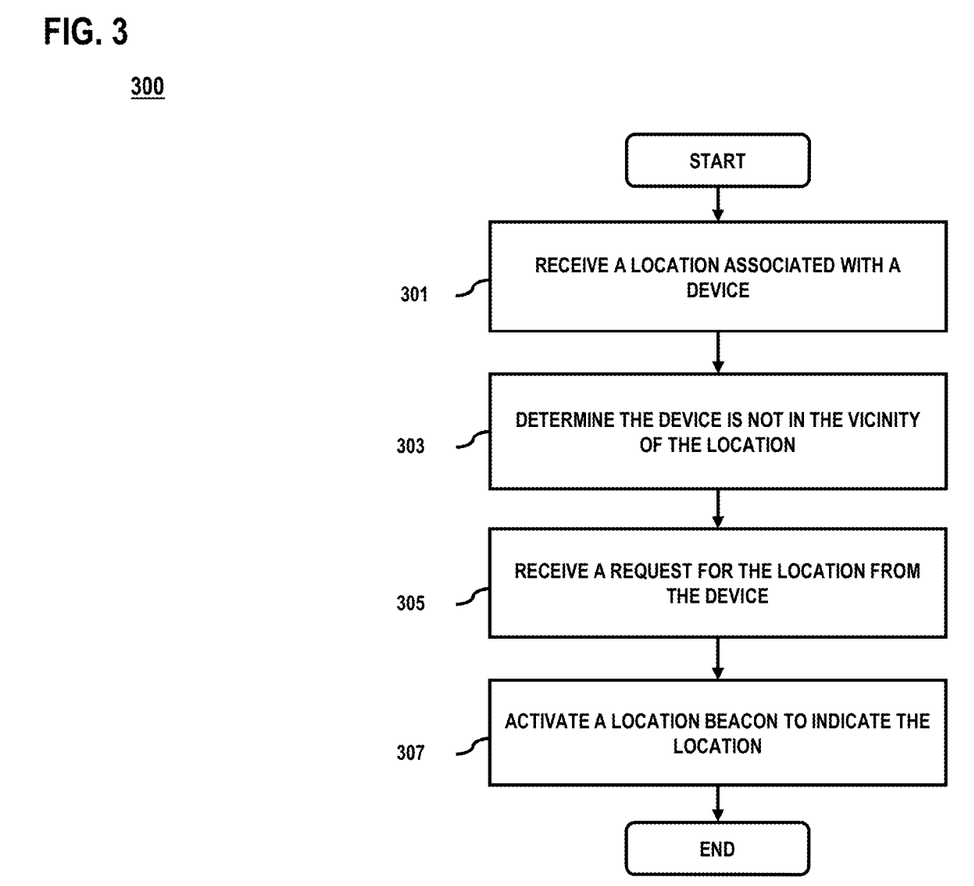
FIG. 3 is a flowchart of a system process for identifying the location of a seat in a venue, according to one embodiment.
Figure 10:
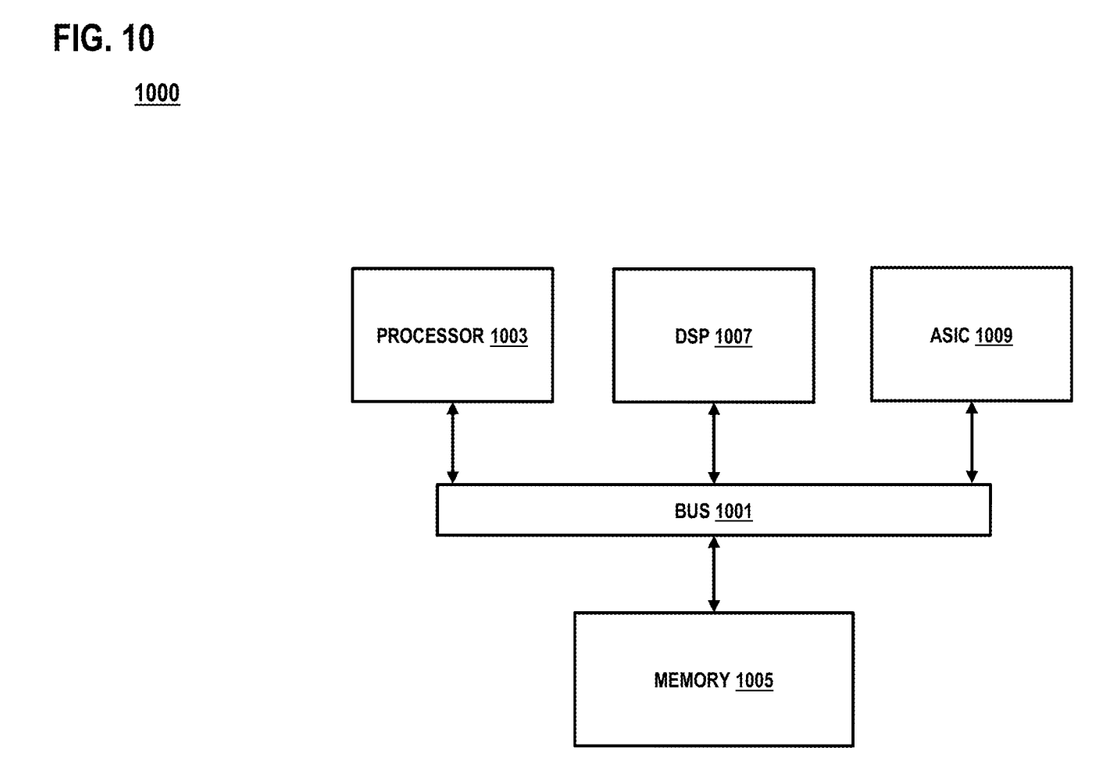
FIG. 10 is a diagram of a mobile terminal (e.g., handset) that can be used to implement an embodiment of the invention.

FIG. 3 is a flowchart of a system process for identifying the location of a seat in a venue, according to one embodiment. In one embodiment, the location beacon platform 101 performs the process 300 and is implemented in, for instance, a chip set including a processor and a memory as shown in FIG. 10. In step 301 the location beacon platform 101 receives a location associated with the device 103, which may be the location of the user/subscriber's ticketed seating or selected seating. By way of example, in this step, the location beacon platform 101 may associate a user device to the user's selected seat based on their purchased ticket of entry or based on user first-come first-serve selection of a seat after entry to the venue. A user identifier may then be temporarily (during the event) matched to a particular seat.

In step 303, the location beacon platform 101 determines that the device 103 is not in the vicinity of the location associated with the user/subscriber. The determination may be accomplished by matching the location associated with the device 103 in step 301 with the location of the device, where the location associated with the device includes the seat location, retrieved from the seating database 107 as previously described. The determination may also be accomplished by receiving information from the user device in the form of a wireless notice stating the user is leaving the his/her seat either by NFC device or user notification. In other embodiments, the determination may be made by loss of connection between the wireless beacon (e.g., Bluetooth®) at the seat and the user device. In other embodiments, the determination may be made by the device from NFC devices located away from the user's seat.

In some embodiments, the location may be locked down while the user is away from the location or prior to their arrival to the location. By way of example, a theater may have VIP seating or standard seating which may be secured to keep other users from using the seat, whether it be by locking the seat in an up position or through other locking methods. In some embodiments, the locking device may automatically unlock based on the user device being within a vicinity of the location/seat.

In step 305, the location beacon platform 101 receives a request for the location from the user's device. It is contemplated the request for the location may automatically triggered as per the user/subscriber profile settings. In other embodiments, the request for the location may be signaled by the user device or by the user device communication with a NFC device. The request may be sent through the wireless methods above, providing the location beacon platform 101 with the user's location request thus activating identifiers of the user's location.

In step 307, the location beacon platform 101 activate a location beacon to indicate the location of the user/subscriber's seat. The location beacon includes a light emitting diode (LED) with various colors and/or lighting patterns, a displayed symbol, a virtual beacon within a navigation application, a wireless beacon, or combination thereof. The location beacon may also be matched with the user device light and/or buzzer indicators to flash at the same time and/or may use the user device light and/or buzzer to strengthen or weaken based on wireless beacon transmission strength. As previously mentioned, it is also contemplated that a navigation aid for directing a user of the device to the seat location is presented to the user/subscriber. It is contemplated that one or more steps of the process 300 may be displayed in a user interface as demonstrated in FIGS. 7A and 8C.

Figure 4:
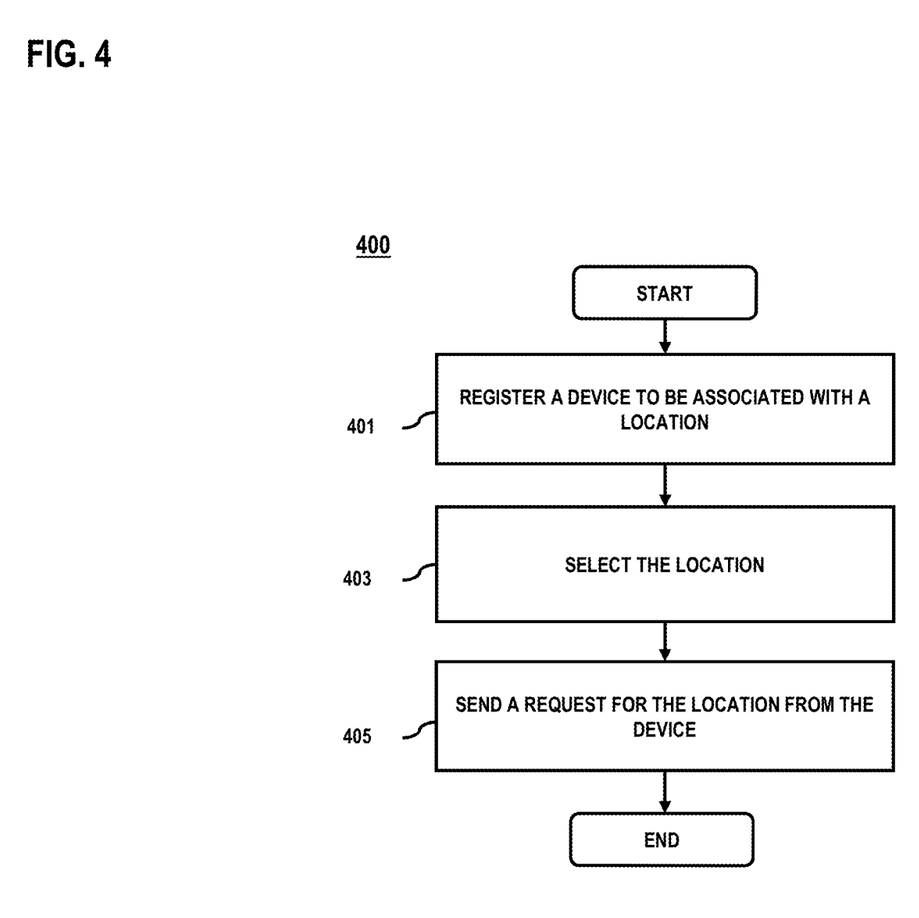
FIG. 4 is a flowchart of a device process for identifying the location of a seat in a venue, according to one embodiment.

FIG. 4 is a flowchart of a device process for identifying the location of a seat in a venue, according to one embodiment. In one embodiment, the device 103 performs the process 400. In step 401, the device 103 may be used to register the device with the location beacon platform 101. The device 103 may then be associated with a particular seat/location which claims the seat as taken by the user. By way of example, the registration makes the user device a subscriber whose information is stored in the subscription database. By way of example, the registration may be accomplished through a website, cloud, or application which may be downloaded to the user device. The device 103 may be associated with particular seat location purchased either prior to or after registration of the user/subscriber. Additionally in some examples, the application may be used for seat selection, location beacon selection, presenting directions, activating beacons, etc. and/or also for other venue actions such as ordering food/drink from concessions, purchasing tickets, trading tickets with other user/subscribers, reserving and/or buying parking spots, etc.

In step 403, the device 103 may be used to select the location in one of many ways. By way of example, device 103 may be used to touch an NFC device or other close range wireless beacon to take ownership of a specific seat. In other examples, the device 103 or other user interface may be used to select a seat which is then considered occupied by the user under their subscription.

In step 405, the device 103 may be used to send a request for the location from the device. This request may be sent via wireless connection through a venue application. In one example, the user notifies the location beacon platform 101 of the user leaving or entering the theater by tapping the NFC device at the seat or at the entrance to the theater. The request would then activate the seat beacon, intermediate path beacon(s), and/or present directions to the seat based on the user preferences or selection. The activation of the seat beacon, intermediate path beacon(s), and/or presentation of directions would then direct the user back to their seat without disturbing other attendees.

Figure 5:
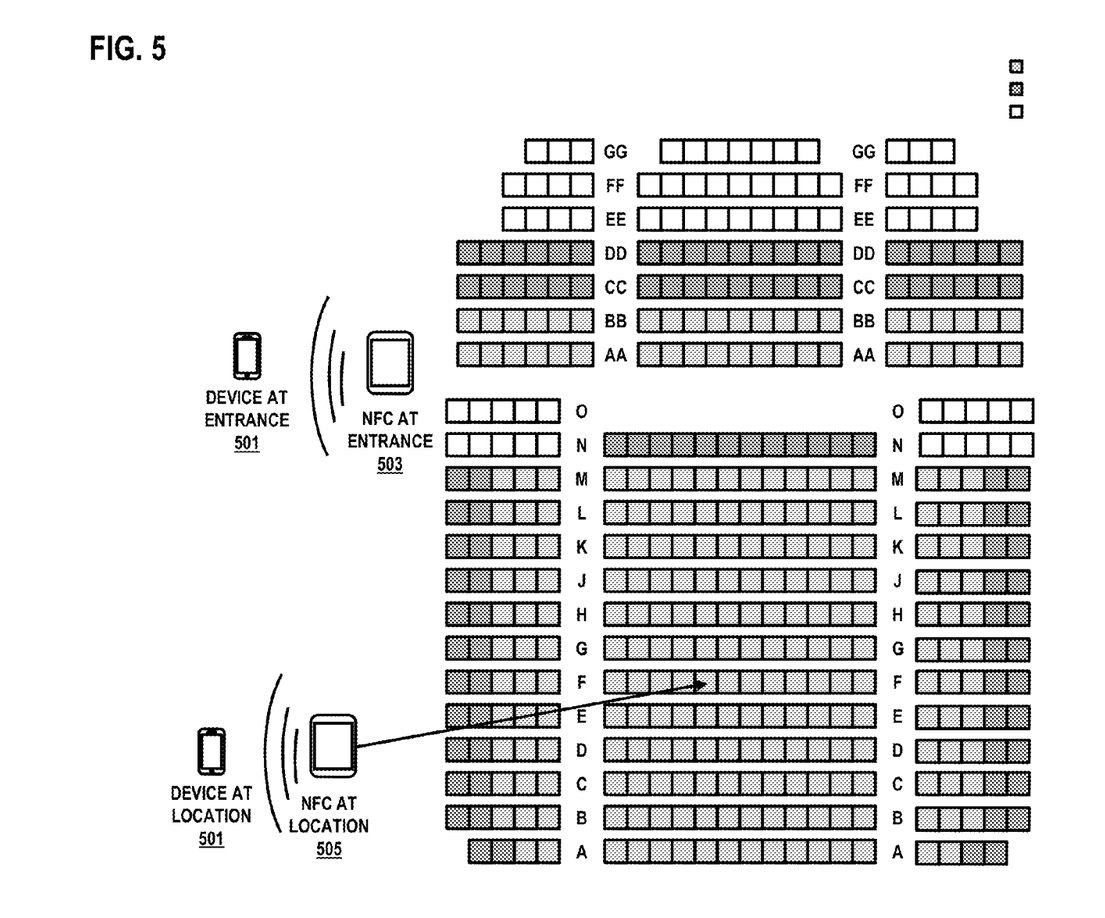
FIG. 5 is a diagram of locations for NFC devices and how they might interact with a user's device, according to various embodiments.

FIG. 5 is a diagram of locations for NFC devices and how they might interact with a user's device, according to various embodiments. In one scenario, an NFC 503 is placed at the entrance of the seating area of a theater. The user may tap their device 501 to the NFC 503 in order to notify the location beacon platform 101 that they are trying to find their seat, whereupon the location beacon platform 101 may either display directions or activate the beacon at the user's seat. In one example embodiment, flat LED lights installed in the flipped up seats may flash a low light to draw the attention of the users, and once the users find their seats they may tap the NFC 505 at their respective seats with their device 501 to notify the location beacon platform 101 to deactivate the beacon. On the other hand, a user may also tap NFC 505 with his/her device 501 as a seat selector, thus associating the user device 501 to the seat and/or letting the location beacon platform 101 know that the user is leaving his/her seat to change seats or to use outside amenities and thus have the location beacon platform 101 activate the beacon. In some examples, communication sites (e.g., NFC devices) may also be placed along various walkways to aid in directing the user to their seat by displaying each step toward finding the user's seat with intermediate path beacons, for example, floor lights may be lit to navigate a user towards his/her seat. In one example, these beacons may light up by section and only illuminate up to the correct aisle, then when the user is at the aisle they may touch another communication site (e.g., NFC device) which may illuminate the aisle up to the correct row, etc.

Figure 6A:
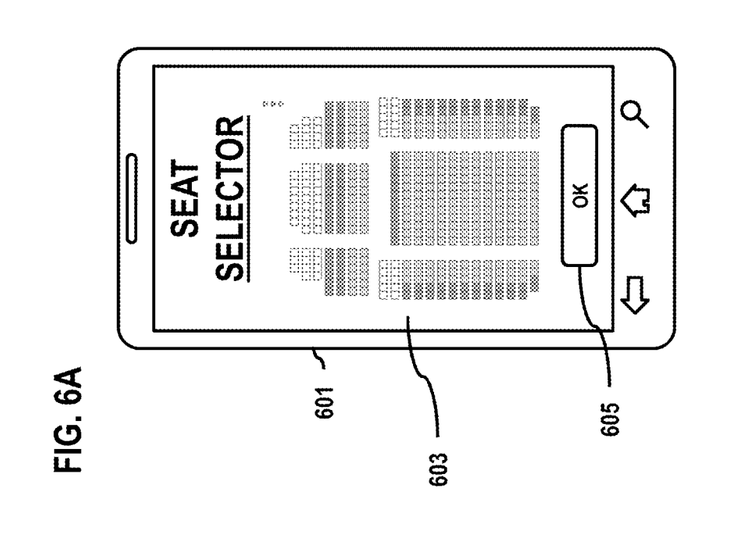
FIGS. 6A and 6B are diagrams of user interfaces utilized in selecting seat location and location beacon, according to one embodiment.
Figure 6B:
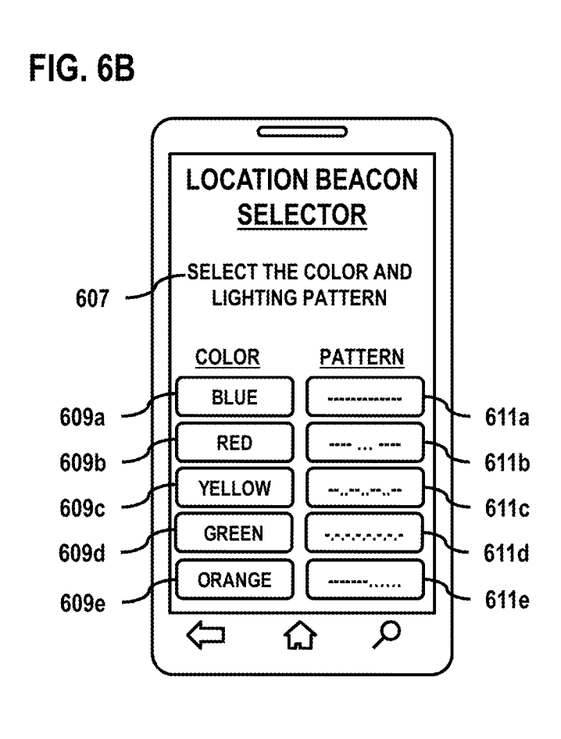

FIGS. 6A and 6B are diagrams of user interfaces utilized in selecting seat location and location beacon, according to one embodiment. FIG. 6A is one embodiment of a user device 601 which displays venue seating to a user from a top-down view 603. The top-down view 603 may be a specific map of the venue stored in the schedule database 111, and may correspond to a ticket purchased by the user for an event at the specific venue. The top-down view 603 may include information such as taken seats in various colors and seats at additional cost in other colors, friends' seats in other colors, etc. The user may then select a seat that is not taken and not a seat incurring an extra expense and then press the OK button 605 to finish selection. In other embodiments, as shown above, the seat may be selected by tapping the user device to a NFC physically located on each seat. In one scenario, a user may arrive at the venue of an event without purchasing a ticket. The user may use the top-down view 603 to check for available any seats for the event. The user may purchase tickets based on his/her seating preference and availability of the seats. In another scenario, a user with a ticket and an assigned seat may utilize the top-down view 603 to become familiar with the venue, for example, the location of his/her seat, locations for lavatory, and any other information regarding the venue.

FIG. 6B is one embodiment of an interface for selecting specific colors 609*a*-609*e* and/or lighting patterns 611*a*-611*e* for the user's corresponding seat location beacon. The interface may include a message 607 stating specific types of selection allowed such as colors and patterns. In other examples, as shown above, the selected beacon may be a symbol, color, lighting pattern, user device buzzer or indicator pattern, or any other known indicator. In other examples, the user device buzzer or indicator pattern may modulate based on the location beacon or may increase in speed as the user gets closer to their seat. In one scenario, the chosen color and/or lighting pattern may be stored in the subscription database 109 for future reference, for example, the location beacon platform 101 may select a color or a lighting pattern from the subscription database 109 for a user during any future events. In another scenario, the location beacon platform 101 may recommend color or lighting pattern gathered from the subscription database 109 to a user for selection. The user may select color or lighting pattern per his/her preference.

Figure 7A:
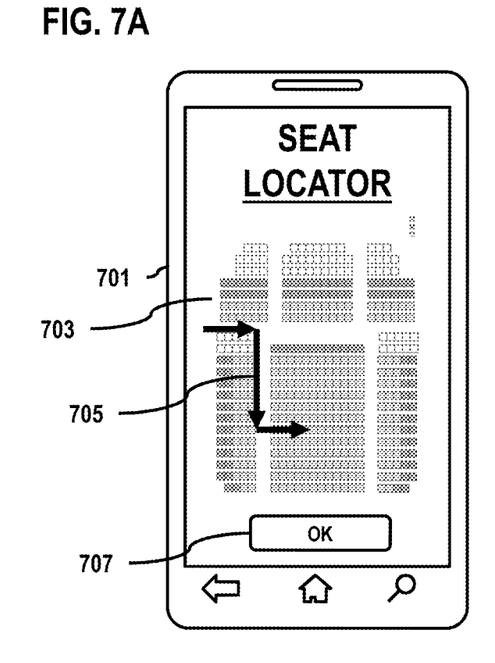
FIGS. 7A and 7B are diagrams of user interfaces utilized in showing the route to a seat location, according to one embodiment.
Figure 7B:
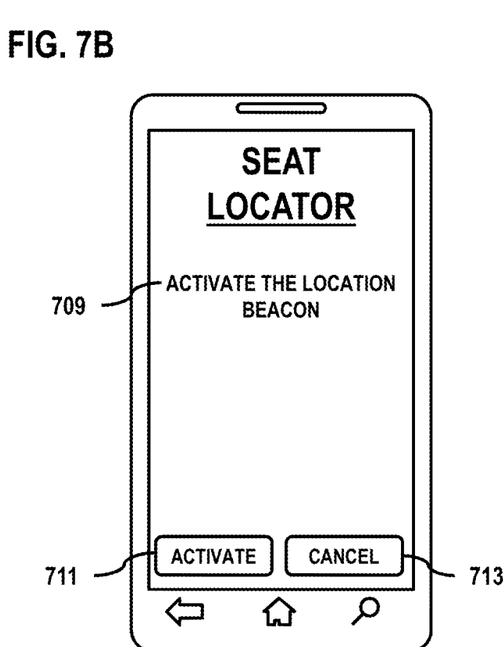

FIGS. 7A and 7B are diagrams of user interfaces utilized in showing the route to a seat location, according to one embodiment. FIG. 7A is one embodiment of a user device 701 which displays directions to a user from a top-down view 703 of theater seating and how to find the user's seat. The directions 705 show what route, from their current location, the user should take to reach their seat by using arrows to direct them along a specific path to their seat location. To exit this view, once the user knows how to get to their seat or is already at their seat they may press button 707. In one scenario, a user may request direction towards the seat of other users, for example, a user may locate a seat occupied by a friend nearby his seating location. The friend may share his seating position with the user via the location beacon platform 101. This enables the users and his/her friend to watch an event together, which otherwise may not have been possible. In another scenario, users who share their seating information with other users may trade tickets and/or seats during the event, or right before the commencement of an event. In another scenario, the location beacon platform 101 may share the location of a user within a venue with his/her friends, wherein the friends may be guided at the direction of the user, and not just to the light of the assigned seats. In one example embodiment, the location beacon platform 101 may cause a presentation of guide lights on the floor, the seating chart, along with the user position within the venue in at least one device 103. This process makes it easier for the friends to locate each other, for example, when a user leaves his/her seat to order food or refreshments.

FIG. 7B is one embodiment of an interface for a user to activate their seat beacon. The interface may display a message 709 stating which action they will be taking along with a button 711 to activate the beacon and a button 713 to exit or cancel the action. In some examples, the activated beacon may include intermediate path beacon(s) that may indicate the next step in directions to a user's seat. Additionally, the user may be presented with the option to active the location beacon prior of after being presented with the seat locator, depending on the user's profile settings.

Figure 8A:
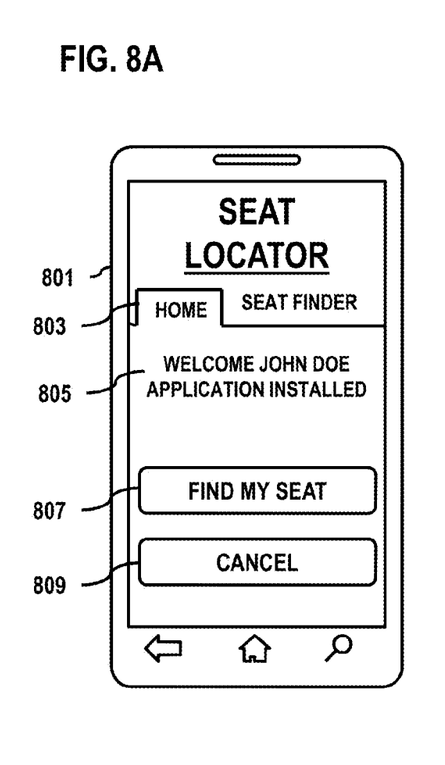
FIGS. 8A-8C are diagrams of user interfaces utilized in selecting the method for locating a seat, according to one embodiment
Figure 8B:
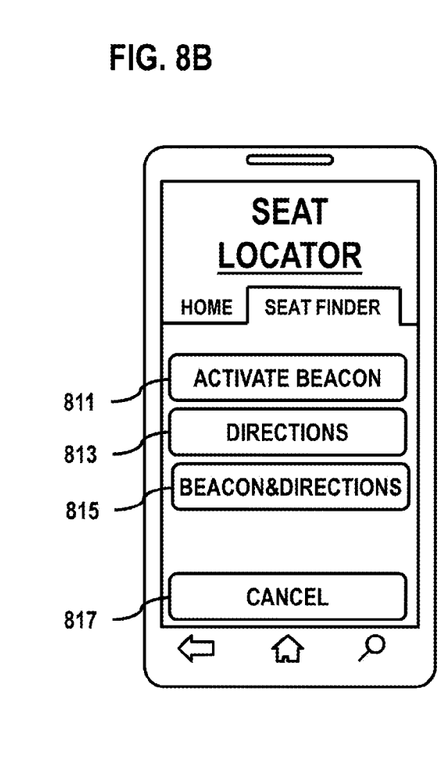
Figure 8C:
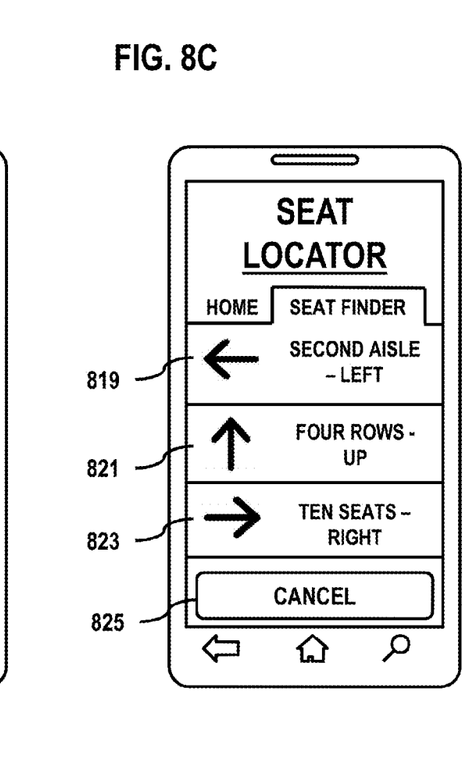

FIGS. 8A-8C are diagrams of user interfaces utilized in selecting the method for locating a seat, according to one embodiment. Where FIG. 8A is one embodiment of a home page where the user's device 801 may present the user with multiple page selections for a home page and seat finder page through selector 803. The user is presented with a welcome message 805 and may select to continue to finding their seat with button 807 or cancel 809. FIG. 8B is one embodiment of the seat finder page to direct the user of the device to their seat where the seat beacon may be activated by button 811, directions may be displayed by button 813, or both directions and beacon may be presented to the user by button 813 depending upon user preference. In some examples, the activated beacon may include intermediate path beacon(s) that may indicate the next step in directions to a user's seat. The user may also cancel and go back to the home page with button 817. Should the user select to be presented with directions or beacon and directions, directions would be displayed for the user to find their seat. FIG. 8C is one embodiment of directions presented to a user after selection where steps 819-823 are directions and actions to take to find the user's seat with large arrows to simply define directions and text explaining how far the user needs to move in those directions to find their seat.

The processes described herein for adjusting one or more device functionalities based on location, movement, noise, or a combination thereof may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
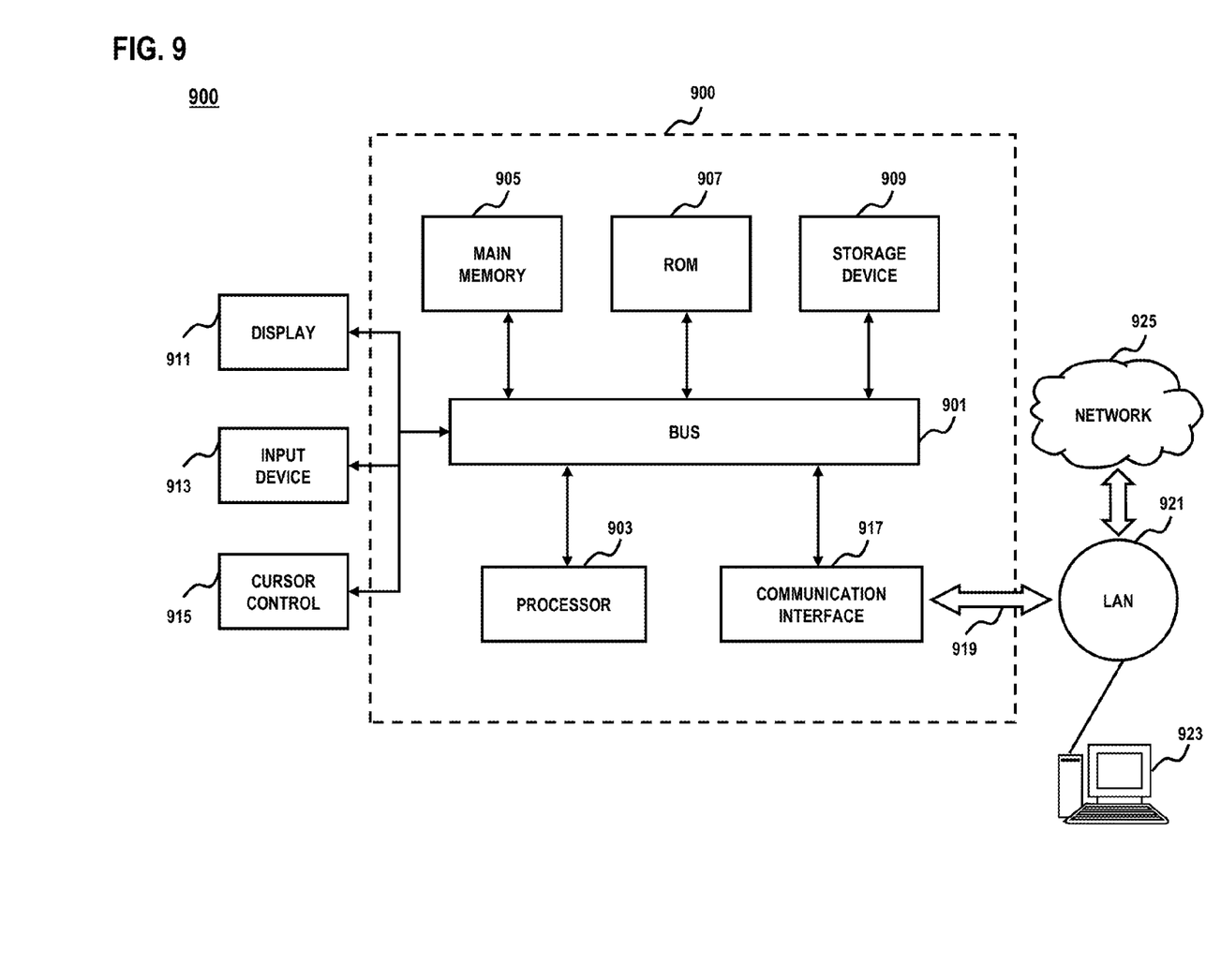
FIG. 9 is a diagram of a chip set that can be used to implement an embodiment of the invention.

FIG. 9 illustrates computing hardware (e.g., computer system) upon which these embodiments can be implemented. The computer system 900 includes a bus 901 or other communication mechanism for communicating information and a processor 903 coupled to the bus 901 for processing information. The computer system 900 also includes main memory 905, such as random access memory (RAM) or other dynamic storage device, coupled to the bus 901 for storing information and instructions (computer program code) to be executed by the processor 903. Main memory 905 also can be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to certain embodiments, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 1001. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g., for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g., a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 10 illustrates a chip set 1000 upon which an embodiment of the invention may be implemented. Chip set 1000 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of FIGS. [3-5].

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
receiving a location associated with a device, wherein the location is based on a communication site for the device, an assigned location of the device, or combination thereof;
determining that the device is not in a vicinity of the location;
receiving, via a first near-field communication (NFC) device located at an entrance of a seating area that includes the location and a plurality of other locations, a request for the location from the device, when the device is located at the entrance of the seating area;
activating a second NFC device, located at the location, to indicate, to the device, the location of the assigned location of the device, wherein the second NFC device is a physical beacon;
activating the second NFC device to visually indicate, via a light of the second NFC device, the location of the assigned location; and
receiving, via the second NFC device, a notification that the device is located at the location.

2. A method of claim 1, further comprising:
presenting a navigation aid for directing a user of the device to the second NFC device.

3. A method of claim 2, wherein presenting the navigation aid includes at least one of:
activating an intermediate path beacon;
pulsing a device buzzer and/or light indicator;
presenting a routing information;
modulating between an active state and an inactive state of the second NFC device; and
selecting a substitute NFC device.

4. A method of claim 1, further comprising initiating the activating of the second NFC device based on at least one of:
determining that the communication site is different from the location;
determining that the device has departed the location; and
receiving a notification that the device has departed the location.

5. A method of claim 1, wherein the location includes a locking device to prevent other persons from using the location, further comprising:
activating the locking device based on a positive determination that the device is not in the vicinity of the location; and
deactivating the locking device based on a negative determination that the device is not in the vicinity of the location.

6. A method of claim 1, further comprising:
receiving a schedule for the location; and
associating the location to a device based on the schedule.

7. A method of claim 1, further comprising:
determining the device is a subscriber; and
determining the second NFC device based on the subscriber.

8. A method of claim 1, wherein the light of the second NFC device includes a light emitting diode (LED) with different colors, lighting patterns, or a displayed symbol.

9. An apparatus comprising a processor configured to:
receive a location associated with a device, wherein the location is based on a communication site for the device, an assigned location of the device, or combination thereof;
determine that the device is not in a vicinity of the location;
receive, via a first near-field communication (NFC) device located at an entrance of a seating area that includes the location and a plurality of other locations, a request for the location from the device, when the device is located at the entrance of the seating area;
activate a second NFC device, located at the location, to indicate the location, wherein the second NFC device is a physical beacon;
activate the second NFC device to visually indicate, via a light of the second NFC device, the location of the assigned location; and
receive, via the second NFC device, a notification that the device is located at the location.

10. An apparatus of claim 9, wherein the apparatus is further configured to:
present a navigation aid for directing a user of the device to the second NFC device.

11. An apparatus of claim 10, wherein the apparatus is further configured to present the navigation aid includes at least one of:
activating an intermediate path beacon;
pulsing a device buzzer and/or light indicator;
presenting a routing information;
modulating between an active state and an inactive state of the second NFC device; and
selecting a substitute NFC device.

12. An apparatus of claim 9, wherein the apparatus is further configured to initiate the activating of the second NFC device based on at least one of:
determining that the communication site is different from the location;
determining that the device has departed the location; and
receiving a notification that the device has departed the location.

13. An apparatus of claim 9, wherein the location includes a locking device to prevent other persons from using the location and the apparatus is further configured to:
activate the locking device based on a positive determination that the device is not in the vicinity of the location; and
deactivate the locking device based on a negative determination that the device is not in the vicinity of the location.

14. An apparatus of claim 9, wherein the apparatus is further configured to:
receive a schedule for the location; and
associate the location to a device based on the schedule.

15. An apparatus of claim 9, wherein the apparatus is further configured to:
determine the device is a subscriber; and
determine the second NFC device based on the subscriber.

16. An apparatus of claim 9, wherein the light of the second NFC device includes a light emitting diode (LED) with different colors, lighting patterns, or a displayed symbol.

17. A system comprising:
a location identification platform configured to receive a location associated with a device, wherein the location is based on a communication site for the device, an assigned location of the device, or combination thereof;
to determine that the device is not in a vicinity of the location;
to receive, via a first near-field communication (NFC) device located at an entrance of a seating area that includes the location and a plurality of other locations, a request for the location from the device, when the device is located at the entrance of the seating area;
to activate a second NFC device, located at the location, to indicate the location, wherein the second NFC device is a physical beacon;
to activate the second NFC device to visually indicate, via a light of the second NFC device, the location of the assigned location; and
to receive, via the second NFC device, a notification that the device is located at the location.

18. A system of claim 17, wherein the location identification platform is further configured:
to present navigation aid for directing a user of the device to the second NFC device.

19. A system of claim 18, wherein the location identification platform is further configured to present the navigation aid including at least one of:
activating an intermediate path beacon;
pulsing a device buzzer and/or light indicator;
presenting a routing information;
modulating between an active state and an inactive state of the location beacon; and
selecting a substitute NFC device.

20. A system of claim 17, wherein the location identification platform is further configured to initiate the activating of the second NFC device based on at least one of:
determining that the communication site is different from the location;
determining that the device has departed the location; and
receiving a notification that the device has departed the location.

* * * * *